United States Patent [19]
Eisenbrey et al.

[11] Patent Number: 5,516,105
[45] Date of Patent: May 14, 1996

[54] ACCELERATION ACTIVATED JOYSTICK

[75] Inventors: Glen T. Eisenbrey, Greenbank; James J. Childress, Mercer Island, both of Wash.

[73] Assignee: Exergame, Inc., Seattle, Wash.

[21] Appl. No.: 319,157

[22] Filed: Oct. 6, 1994

[51] Int. Cl.$^6$ ........................................................ A63F 9/22
[52] U.S. Cl. ........................................................ 273/148 B
[58] Field of Search ........................................ 273/148 B

[56]  References Cited

U.S. PATENT DOCUMENTS

| | | | |
|---|---|---|---|
| 3,834,702 | 9/1974 | Bliss | 273/86 B |
| 3,935,660 | 2/1976 | Plew | 43/42.31 |
| 3,935,669 | 2/1976 | Potrzuski et al. | |
| 4,107,642 | 8/1978 | Crummett | 338/128 |
| 4,121,488 | 10/1978 | Akiyama | 84/1.01 |
| 4,425,488 | 1/1984 | Moskin et al. | 200/220 |
| 4,445,011 | 4/1984 | Hansen | 200/52 R |
| 4,720,789 | 1/1988 | Hector et al. | 364/410 |
| 4,817,950 | 4/1989 | Goo | 273/148 B |
| 4,862,172 | 8/1989 | Ross | 341/157 |
| 4,925,189 | 5/1990 | Braeunig | 273/148 B |
| 5,059,958 | 10/1991 | Jacobs et al. | 340/706 |
| 5,076,584 | 12/1991 | Openiano | 273/148 B |
| 5,139,261 | 8/1992 | Openiano | 273/148 B |
| 5,142,655 | 8/1992 | Drumm | 379/52 |
| 5,232,223 | 8/1993 | Dornbusch | 273/148 B |

*Primary Examiner*—William H. Grieb
*Attorney, Agent, or Firm*—Stratton Ballew

[57]  ABSTRACT

A video game user interface device that allows the user to play standard video games using realistic arm, leg and body movements which relate to the various activities portrayed in the video game being played. The device is sensitive to acceleration and outputs a signal to the video game controller when an acceleration is detected.

19 Claims, 4 Drawing Sheets

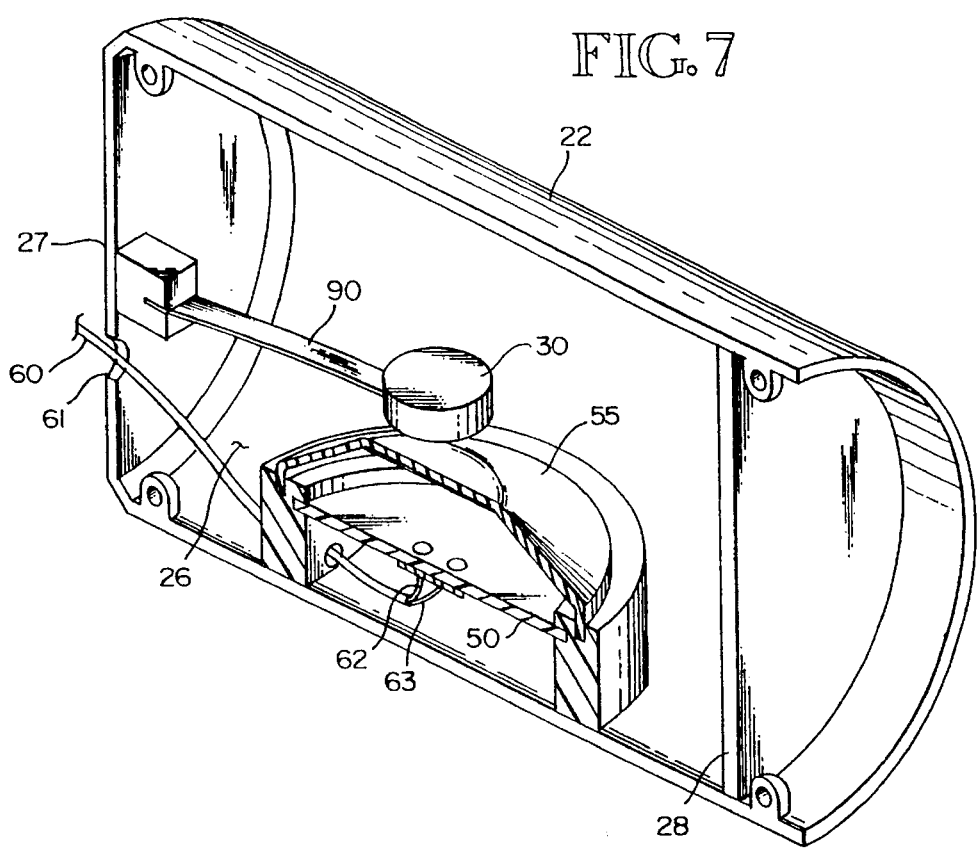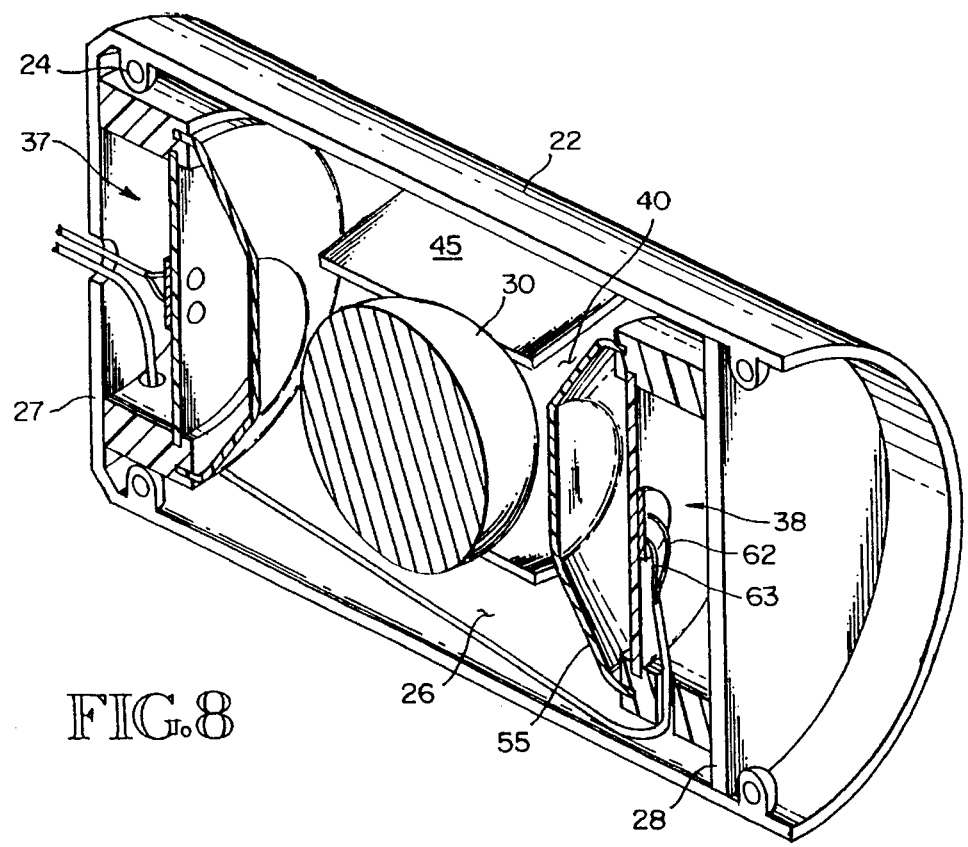

ACCELERATION ACTIVATED JOYSTICK

BACKGROUND OF THE INVENTION

1. Field of the Invention

The invention generally relates to manually operable, multi-functional or multi-directional control devices such as joystick controls or the equivalent for controlling variables in electrical apparatus such as video games, exercise equipment, computers and machinery. The invention particularly relates to those controllers which require gross muscle movements by the user to control video games thereby providing a stimulating environment for exercise.

2. Description of the Prior Art

It is known to use exercise equipment to control video games in an effort to stimulate the user to exercise on a regular basis and for more prolonged periods by providing the user with a fun and challenging exercise environment.

U.S. Pat. No. 5,059,958 for a Manually Held Tilt Sensitive Non-Joystick Control Box shows a video game playing system with gravity switches contained within the system housing. The switches, which control the video game input, are responsive to changes in attitude of the box relative to the neutral position. The neutral position for this apparatus is the plane whose perpendicular is in the direction of the gravitational pull of the earth. Similarly, U.S. Pat. No. 4,862,172 for a Computer Control Apparatus Including A Gravity Referenced Inclinometer contains a gravity switch which requires the same plane as a neutral position. The same can be said of U.S. Pat. No. 5,232,223 for an Electronic Game Controller, U.S. Pat. No. 5,142,655 for a Computer Input Device Using An Orientation Sensor, U.S. Pat. No. 4,445,011 for a Freestanding Multi-directional Electrical Control Device, U.S. Pat. No. 4,425,488 for a Pistol Grip Controller, and U.S. Pat. No. 4,107,642 for a Potentiometer Joystick.

U.S. Pat. No. 3,935,669 for an Electrical Signal Mechanism Actuated in Response To Rotation About Any Of Three Axes discloses pairs of opposed gravity switches. Angular acceleration of the member to which the switches are attached cause both switches in a pair of to close. The unit depends on the gravitational pull of the earth to ensure that at least one switch in a pair is open when the member is not in rotation.

The use of foot actuated controllers is also well known. For example, U.S. Pat. No. 5,076,584 and its Continuation-In-Part U.S. Pat. No. 5,139,261 for a Foot-Actuated Computer Game Controller Serving As A Joystick discloses the use of hand and foot actuated pressure or proximity switches to provide user input to a video game. The user can orient the switches about the floor and walls of a room to provide for an exercise workout while she plays the video game. These switches are normally in an open circuit position which relays an Off signal to the video game controller. When struck or approached the switches move to a closed circuit position thereby relaying an On signal to the video game controller. The system has an optional hand held controller with weights attached. The hand controller is responsive to selective manual actuation of what are typically push-button switches. U.S. Pat. No. 4,720,789 also discloses a foot actuated video game system in which a pressure switch is normally in an open or Off position and is closed by stepping on the switch, sending an On signal to the video game controller. A similar method is used in U.S. Pat. No. 4,121,488 for a Step-On Tune Tone Scale Play Device, and U.S. Pat. No. 3,834,702 for a Jogging Game.

SUMMARY OF THE INVENTION

The invention comprises, using an acceleration activated switching mechanism as a user input device for electronic equipment, and in particular for video game systems. This input device can be constructed so as to require gross muscle movement by the user, requiring the user to exercise in order to control the action in a video game.

A first object of this invention is to stimulate a user to exercise on a more regular and prolonged basis by providing a means for playing a variety of stimulating video games through the various movements involved in exercise regime.

A second object of this invention is to provide a video game interface operated by the player's forceful arm movements such as swinging or thrusting.

A third object is to realistically associate the movements required to operate the joystick with the actions being played out in the video game.

A fourth object is to allow the user to simulate a variety of sports equipment by interchanging inexpensive appendage parts on a single handle containing the control mechanism.

A fifth object of this invention is to allow the attachment of weights to enhance the efficiency of the exercise or to more closely simulate the feel of the piece of sports equipment being used in the video game.

A sixth object is to provide a method of controlling a video game through walking, jogging, running and jumping movements by the user.

A seventh object is to provide a video game input that can discriminate between standing and walking even though while walking at least one foot is always in contact with the ground.

A eight object of this invention is to provide a user interface that can be configured to accept a variety of inputs and to associate a variety of outputs to those inputs.

BRIEF DESCRIPTION OF THE DRAWINGS

FIG. 7 is a sectional perspective view of an alternative embodiment of the invention wherein the mass is mounted at the end of a spring.

FIG. 8 is a sectional perspective view of an alternative embodiment of the invention wherein an acceleration activated switch is mounted at each end of the race.

DESCRIPTION OF THE PREFERRED EMBODIMENTS

Figure 1:
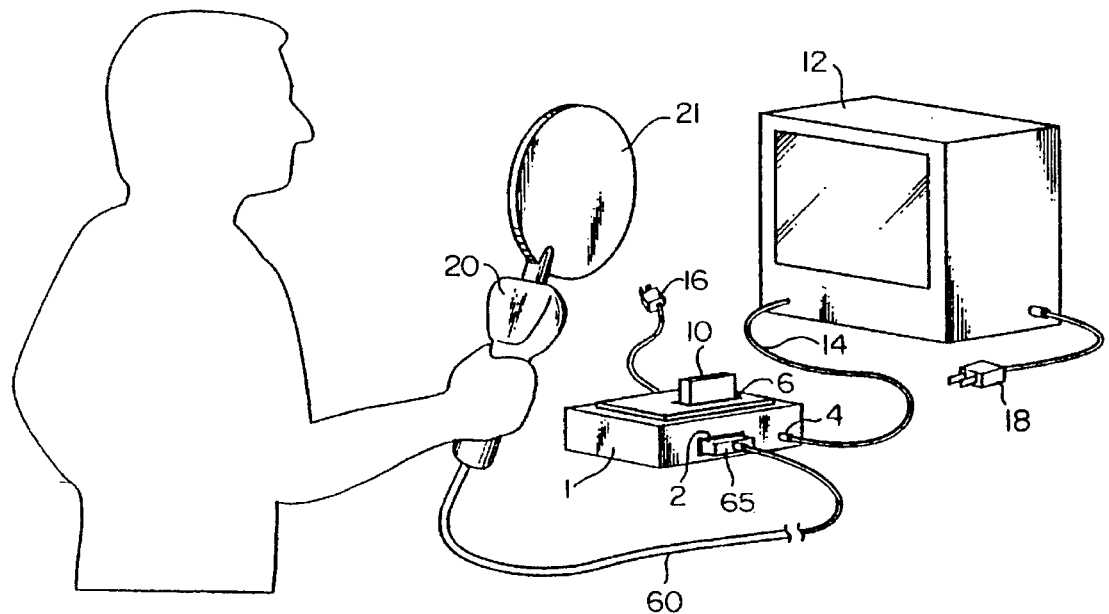
FIG. 1 is a perspective view of the first preferred embodiment of the invention with a tennis racket appendage and associated video game equipment.

With reference to the drawing, FIG. 1, a standard video game controller 1, is provided, the video game controller 1 having: i) an input port 2 for receiving signals generated by the user; ii) an output port 4 for transmitting video image signals, and iii) a video game cartridge port 6 for receiving preprogrammed cartridges 10 which carry the program defining each particular video game. A standard video monitor 12 is also provided, the video monitor 12 having an input port 14 for receiving video image signals from the video game controller 1. The video game controller 1 is connected through its output port 4 to a video monitor 12 using appropriate means such as a standard coaxial cable 14, or standard antenna wire for transferring audio and visual information. The video game controller 1 and the video monitor 12 are each powered by 110 V. AC supplied by respective plugs 16, 18 when connected to a conventional electric outlet. The video game controller 1 and video monitor 12 may be combined as an integral part of the apparatus, or may be separate units located apart from the apparatus and each other, if desired. Also provided, is an acceleration activated apparatus 20.

Figure 2:
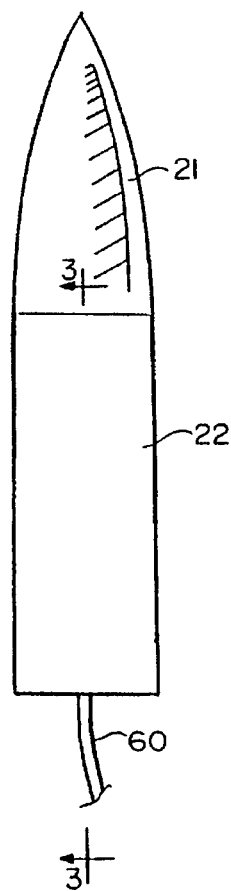
FIG. 2 is an elevational plan view of the embodiment of FIG. 1 with a sword appendage.
Figure 3:
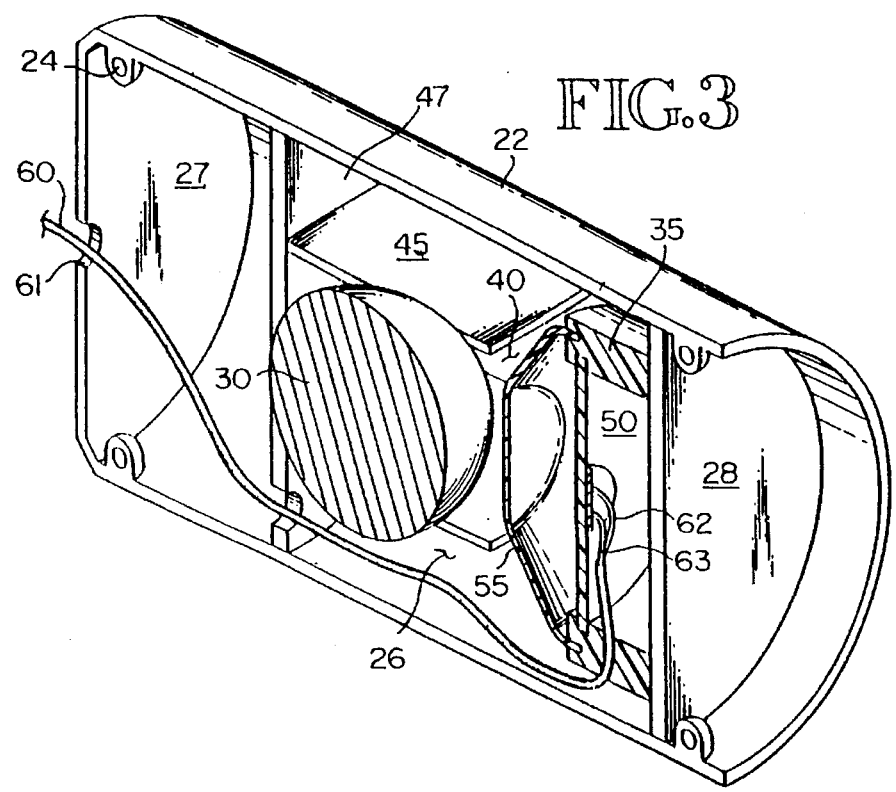
FIG. 3 is a sectional view of the embodiment of FIG. 1 taken along sectional line 3 of FIG. 2.
Figure 4:
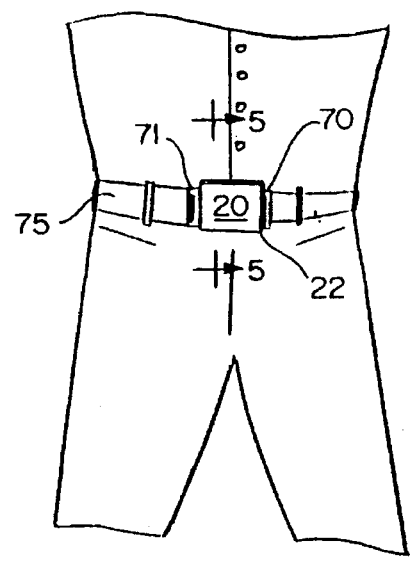
FIG. 4 is a perspective view of the second preferred embodiment worn as a belt.

As shown in FIGS. 2, 3, 4, 5 and 6, the acceleration activated apparatus 20 has a housing 22. With reference to FIG. 2, in the first preferred embodiment the housing 22 is designed to be held in a user's hand. With reference to FIG. 4, in a second preferred embodiment, the housing 22 is designed for being mounted on the user or the user's clothing. The housing 22 may be made of any suitable material, however, an ABS plastic is preferred.

With reference to FIGS. 2 and 3, in the first preferred embodiment the housing 22 is cylindrical, being formed of two longitudinal halves. Each half has pins and holes 24, or tabs and slots, for securely joining the respective halves together. A length of 6 inches and a diameter of 2¼ inches, is preferred for the housing 22, for comfortably fitting in a user's hand. An appendage 21 may be mounted onto the housing to simulate a piece of game playing equipment. Appendages 21 may resemble a sword, a baseball bat, a tennis racket and other types of sports equipment. The appendage 21 may be removably mounted by using a conventional screw type or bayonet type mounting.

Figure 5:
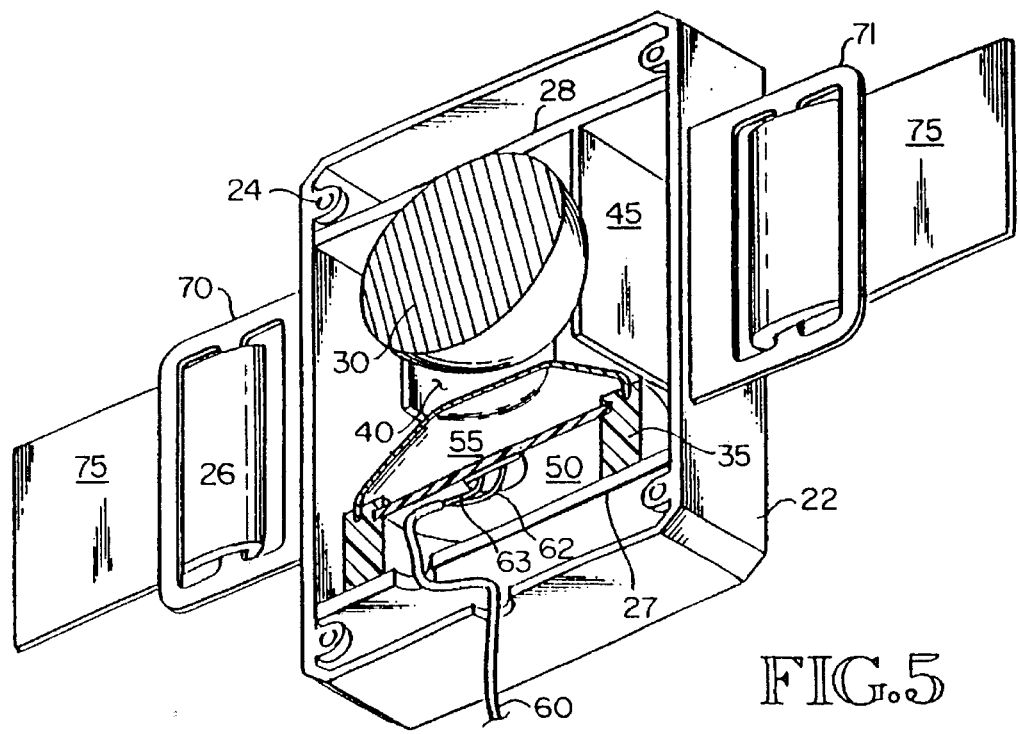
FIG. 5 is a sectional plan view of the second preferred embodiment taken along sectional line 5 of FIG. 4.

In the second preferred embodiment, FIGS. 4 and 5, the housing 22 may be of any small shape that is suitable for attaching to the user or the user's clothing.

With reference to FIGS. 3 and 5, a cavity 26 is defined by the inside surface of the housing 22 for containing the mechanism and circuitry of the acceleration activated apparatus 20. The housing 22 has a pair of end walls 27, 28 fixed at respective ends of the housing 22.

With further reference to FIGS. 3 and 5, a mass 30 is received within the housing 22 for movement therein under inertial force. An acceleration activated switch 35 is fixed in the cavity 26 and operatively associated with the mass 30, such that the switch 35 is activated by the force of the mass 30 when accelerated by movement of the housing 22.

In the first and second preferred embodiments, FIGS. 3 and 5, a race 40 for guiding the mass 30 is defined within the cavity 26. While many types of races are suitable, a ball race 40 is preferred. In the case of a ball race 40, the mass 30 is implemented as a sphere or ball. While other shapes are suitable for the mass 30, provided an appropriate race 40 is provided, a ball 30 is preferred for its ability roll within the race 40, thus reducing the friction between itself and the race 40. It is also possible to use a shape that permits the mass 30 to slide within the race 40.

In an alternative embodiment, shown in FIG. 7, the mass 30 is fixed on one end of spring 90. The other end of spring 90 is fixed within the housing 22. The mass 30 is free to move within the cavity, in and out of operative relation with the acceleration activated switch 35. In this alternative, the shape of the mass is not dictated by the geometry of any guide race.

In the first and second preferred embodiments, FIGS. 3 and 5, the ball race 40 is composed of four vanes 45,. The vanes 45 extending radially from the inside surface of the housing 22, toward the center of the housing 22, the vanes 45 being integral with the housing 22. Each vane 45 has a partner directly opposite from itself, such that the pair of vanes 45 are coplanar. The planes defined by each pair of vanes, two pairs of vanes being defined in the preferred embodiment, are not necessarily perpendicular to one another, and in the preferred embodiment are separated by 60 and 120 degrees respectively. Other methods of forming the ball race 40 are possible, including: having arcuate opposing surfaces form the race members, or having more or less than four vanes.

With continuing reference to FIGS. 3 and 5, the vanes 45 are of such a length as to define a ball race 40 between each pair. The race 40 should allow the ball 30 to roll, yet retain the ball 30, to permit only motion along the longitudinal axis. In the preferred embodiment, the ends of the each vane 45 in a pair are separated by 0.5 inches, thus permitting the use of a 1 inch diameter ball.

The mass 30 may be of any shape or material. As noted above, a spherical shape is preferred for reducing friction between the race 40 and the mass 30. Stainless steel is the preferred material for the ball 30.

A back stop 47 is fixed within the housing 22, across the ball race 30 and perpendicular to the longitudinal axis of the ball race 30. The back stop 47 serves to limit the travel of the mass 30 at one end of the ball race 30. The back stop 47 may be made of any suitable material, however, a material capable of dampening the motion of the ball 30 is preferred, such as a close-cell foam rubber. Alternatively, the back stop 47 may be integral with the housing 22 and composed of the same material as the housing 22, such as ABS plastic.

An acceleration activated switch 35 is fixed within the housing 22 at the opposite end of the ball race 30 from the back stop 47. The acceleration activated switch 35 is spaced from the back stop 47 such that the ball 30 may achieve a sufficient acceleration, under inertial force produced by the movement of the housing 22 by the user, to trigger the acceleration activated switch 35. In the preferred embodiment, the acceleration activated switch 35 is implemented as a circuit board switch contact 50 operatively spaced from a silicon rubber dome switch 55.

The dome switch 55 is fixed across the ball race 40, perpendicular to the longitudinal axis of the ball race 40, the dome switch 55 being convex with respect to the back stop 47. The circuit board switch contact 50 is fixed within the housing 22, perpendicular to the longitudinal axis of the ball race 40, with its contacts facing the dome switch 55. The circuit board switch contact 50 is placed adjacent to the rubber dome switch 55, so that deformation of the switch 55, due to contact of the mass 30 with the switch 55, causes contact of the dome switch 55 with the circuit board 50, thereby closing the circuit.

Any pair of contacts capable of being operatively closed by the deformation of a resilient member 55 by the accelerated mass 30 may be used.

The spring constant of the acceleration activated switch 35, the mass of the ball 30, and the distance between the acceleration activated switch 35 and the back stop 47 may be chosen so as to achieve a closed circuit condition under a predetermined force.

The housing 22 contains a means for transmitting the switch condition to a video game controller 1, or an interface to a video game controller 1.

In the preferred embodiment, a cable 60 is fixed to the housing 22, at a cable port 61 in an end the wall 27 of the housing 22, using conventional strain release methods, not shown. The wires 62, 63 carried within the protective sheath of the cable 60 are connected to the circuit board switch contact 50. The cable 60 has a connector 65 at its terminus for connecting with the input port 2 of a video game controller 1, or an interface to a video game controller 1.

In an alternative embodiment, not shown, an RF transmitter is contained within the housing 22, for transmitting radio frequency signals indicating the state of the acceleration switch 35 to a receiver connected to a video game controller 1 or an interface device. Likewise, an infrared system may be incorporated in the housing 22 for transmitting the signals to an appropriate interface.

In another alternative embodiment of the invention, shown in FIG. 8, an acceleration activated switch 37,39 is fixed at each end of the race 40. This permits detection of movements in two directions along a given axis.

Figure 6:
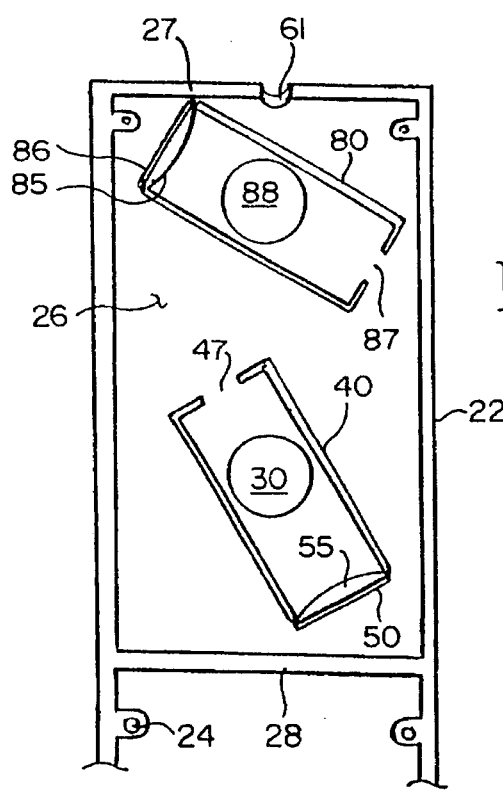
FIG. 6 is a sectional plan view of a multiple race embodiment.

In a further embodiment of the invention, shown in FIG. 6, two races 40, 80 with associated circuit board contact switches 50, 82, dome switches 55, 85 and back stops 47, 87 are defined in the housing, for respectively detecting UP/DOWN (hammering) and In/Out (punching) arm movements. This embodiment is particularly suited for providing input to boxing type video games and for general aerobic workouts.

With further reference to FIG. 6, in the single race embodiment, the race 40 can have its longitudinal axis along the direction of motion to be detected. While this is also possible in the multiple race embodiment, it is preferred to incline the longitudinal axes of the races 40, 80 slightly, away from the direction of motion with which each axis is associated. This is to compensate for erratic arm and hand movements that can be expected of the user. The inclination should be less than 45°, 30° being perferrable.

The acceleration imparted to the masses 30, 88 by the movement of the housing 22, may be reduced into its constituent vectors. By inclining the ball races 40, 80, the dominate component of the resolved acceleration vector will tend to carry the appropriate mass, for example ball 30, up its associated race 40, while tending to drive the other mass, for example ball 88 into the side of its own race 80. This ensures that only the correct acceleration activated switch 35 is activated.

As shown in FIGS. 4 and 5, in the second preferred embodiment the acceleration activated apparatus 20 is provided with conventional structure for removably mounting the apparatus 20 to a user or her clothing. Such structure may include a clip attachment, elastic strap or a set of attachment loops 70, 71 for a belt 75.

Additionally, weights may be mounted to the acceleration activated apparatus 20, for increasing the efficiency of the exercise program or for providing a more realistic feel to the selected sports equipment type appendage 21.

We claim:

1. An acceleration activated apparatus for providing input signals to a video game controller, the acceleration activated apparatus which comprises:

a housing, the housing having a cavity formed therein;

at least a first acceleration activated switch received in the cavity, the acceleration activated switch having a resilient member movable between an undeformed position in which the first acceleration activated switch is in an open condition and a deformed position in which the first acceleration activated switch is in a closed condition;

a mass received in the cavity for movement into and out of operative contact with the resilient member of the first acceleration activated switch; and means for relaying the condition of the first acceleration activated switch to the video game controller.

2. The acceleration activated apparatus of claim 1 wherein the cavity forms a race for guiding the mass;

the first acceleration activated switch is fixed at a first end of the race.

3. The acceleration activated apparatus of claim 2 further comprising:

a second acceleration activated switch, the second acceleration activated switch fixed at a second end of the race opposed to and spaced from the first acceleration activated switch.

4. The acceleration activated apparatus of claim 1 wherein the cavity defines a ball race;

the first acceleration activated switch is fixed proximate a first end of the ball race; and the shape of the mass is spherical and the mass is rotatably received in the ball race.

5. The acceleration activated apparatus of claim 4 further comprising means for stopping fixed at a second end of the ball race, opposed to and spaced from the first acceleration activated switch.

6. The acceleration activated apparatus of claim 4 wherein the ball race comprises at least two vanes, the vanes integral to the housing and extending radially inward therefrom.

7. The acceleration activated apparatus of claim 4 wherein the ball race comprises four vanes, integral to the housing and extending radially into the cavity therefrom.

8. The acceleration activated apparatus of claim 4 wherein the ball race comprises at least two arcuate surfaces.

9. The acceleration activated apparatus of claim 1 wherein the first acceleration activated switch comprises:

a rubber dome switch; and a circuit board switch contact mounted in the housing adjacent to the rubber dome switch for operative engagement thereby.

10. The acceleration activated apparatus of claim 1 wherein the relaying means comprises electrical conducting wires, the wires electrically connected to the first acceleration activated switch.

11. The acceleration activated apparatus of claim 1 wherein the relaying means comprises a radio frequency transmitter received in the cavity and operatively connected to the first acceleration activated switch.

12. The acceleration activated apparatus of claim 1 wherein the relaying means comprises: an infrared system received in the cavity, the infrared transmitter operatively connected to the first acceleration activated switch.

13. The acceleration activated apparatus of claim 1 wherein:

the cavity defines a first race and a second race, the second race generally perpendicular to the first race;

the first acceleration activated switch is fixed proximate a first end of the first race;

a second acceleration activated switch is fixed proximate a first end of the second race, the second acceleration activated switch having a resilient member movable between an undetermined position in which the second acceleration activated switch is in an open condition and a deformed position in which the second acceleration activated switch is in a closed condition;

first means for stopping is fixed at a second end of the first race;

second means for stopping is fixed at a second end of the second race;

a first mass received in the first race between the first acceleration activated switch and the first stopping means for movement into and out of operative engagement with the resilient member of the first acceleration activated switch; and a second mass received in the second race between the second acceleration activated switch and the second stopping means for movement into and out of operative engagement with the resilient member of the second acceleration activated switch.

14. The acceleration activated apparatus of claim 1 further comprising an appendage mounted to the housing.

15. The acceleration activated apparatus of claim 1 further comprising means for mounting the acceleration activated apparatus to a user's body.

16. The acceleration activated apparatus of claim 15 wherein the mounting means comprises:

a belt.

17. The acceleration activated apparatus of claim 15 wherein the mounting means comprises:

a clip.

18. The acceleration activated apparatus of claim 1 further comprising:

a spring received in the cavity, the spring having a first end and a second end, the mass mounted to the first end of the spring, the second end of the spring mounted to the housing.

19. An acceleration sensitive video game input apparatus for detecting user generated movements and providing an indication of such movements to a video game controller, the input apparatus which comprises:

a housing having a bore defined therein;

an electrical switch circuit fixed in the bore;

a spherical mass received within the bore for rolling movement between a deformed position and a undeformed position;

resilient means for closing the electrical switch circuit when the spherical mass is in the deformed position and opening the electrical switch circuit when the spherical mass is in the undeformed position; and means for relaying the condition of the circuit to the video game system.

* * * * *